US007825808B2

(12) United States Patent
Kim (10) Patent No.: US 7,825,808 B2
(45) Date of Patent: Nov. 2, 2010

(54) TABLET PACKAGING CONTROLLING APPARATUS OF AUTOMATIC TABLET PACKAGING MACHINE

(75) Inventor: Jun-ho Kim, Dalseo-gu (KR)

(73) Assignee: JVM Co., Ltd., Daegu (KR)

( * ) Notice: Subject to any disclaimer, the term of this patent is extended or adjusted under 35 U.S.C. 154(b) by 460 days.

(21) Appl. No.: 11/831,425

(22) Filed: Jul. 31, 2007

(65) Prior Publication Data

US 2008/0042843 A1 Feb. 21, 2008

Related U.S. Application Data

(63) Continuation-in-part of application No. 11/144,937, filed on Jun. 6, 2005, now abandoned.

(30) Foreign Application Priority Data

Sep. 8, 2004 (KR) ...................... 10-2004-0071839

(51) Int. Cl.
*G08B 13/14* (2006.01)
(52) U.S. Cl. .................... 340/572.4; 700/225; 700/231; 700/244
(58) Field of Classification Search .............. 340/572.1, 340/572.4, 10.1, 10.51, 5.9, 3.3; 700/231, 700/236, 242–244, 225
See application file for complete search history.

(56) References Cited

U.S. PATENT DOCUMENTS

| 5,709,063 | A | 1/1998 | Yuyama et al. |
| 5,852,911 | A | 12/1998 | Yuyama et al. |
| 5,930,145 | A | 7/1999 | Yuyama et al. |
| 6,702,146 | B2 | 3/2004 | Varis |
| 7,139,639 | B2 | 11/2006 | Broussard et al. |
| 2004/0158350 | A1 | 8/2004 | Ostergaard et al. |
| 2005/0125097 | A1 | 6/2005 | Chudy et al. |
| 2005/0256609 | A1* | 11/2005 | Kim ........................... 700/236 |
| 2006/0058917 | A1 | 3/2006 | Vonk et al. |
| 2006/0224274 | A1 | 10/2006 | Broussard et al. |

* cited by examiner

*Primary Examiner*—Thomas J Mullen
(74) *Attorney, Agent, or Firm*—Oblon, Spivak, McClelland, Maier & Neustadt, L.L.P.

(57) ABSTRACT

Disclosed is a tablet packaging controller of an automatic tablet packaging machine for recognizing information of tablets accommodated in tablet cassettes and tracking positions of the tablet cassettes. The controller includes RF tags recording tablet information, and tablet information access units receiving the tablet information via a wireless line, to transmit tablet information and identification information of cartridges to a host terminal, or to record new tablet information in the RF tags. The host terminal creates and stores position arrangement information of the tablet cassettes, estimates a quantity of remaining tablets, controls tablets to be discharged in a certain order of tablet cassettes, and controls the tablet information access units to package only the accommodated tablets when the remaining tablets are short, and displays the short tablet on an LCD, and controls the tablet information access units to package the remaining tablets when the short tablets are supplemented.

10 Claims, 3 Drawing Sheets

Fig.1

PRIOR ART

TABLET PACKAGING CONTROLLING APPARATUS OF AUTOMATIC TABLET PACKAGING MACHINE

The present application is a continuation in part of U.S. patent application Ser. No. 11/144,937 filed on Jun. 6, 2005 and now abandoned.

BACKGROUND OF THE INVENTION

1. Field of the Invention

The present invention relates to a tablet packaging controlling apparatus capable of identifying information of tablets to be accommodated in a tablet cassette, of automatically tracking a position of a tablet cassette mounted to a specific cartridge, of analyzing a current status of the tablets accommodated in the tablet cassette, and of notifying the tablets being short when prescribing of the tablets.

2. Description of the Related Art

Generally, automatic tablet packaging machines feed tablets into tablet cassettes based on kinds of the tablets, and selectively feeds the tablets from cassette supports by coupling the tablet cassettes with the cassette supports.

These automatic tablet packaging machines are disclosed in Japanese Patent Application NOS. 1994-208787 and 2001-89865, and Korean Utility Model Registration NO. 276236, and etc.

Figure 1:
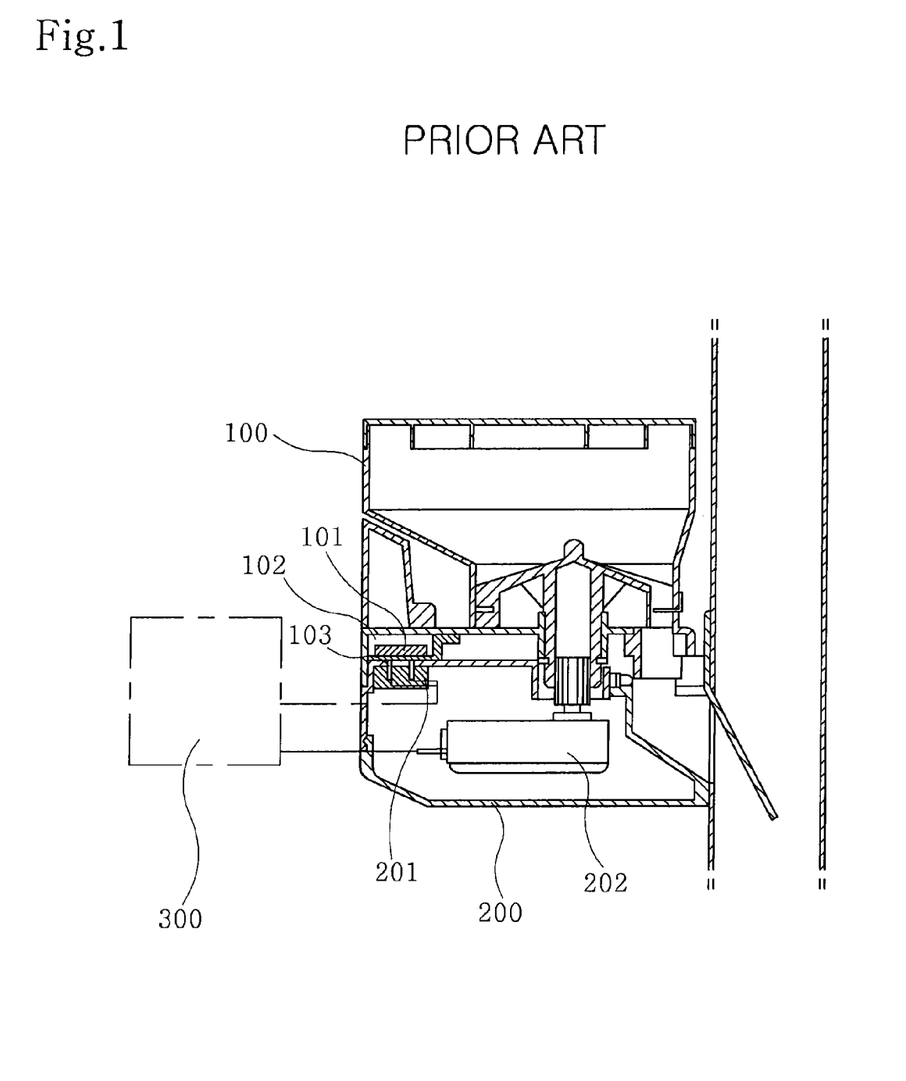
FIG. 1 is a view illustrating the driving of a tablet identification device of a conventional automatic tablet packaging machine.

Operations of the automatic tablet packaging machine disclosed in Korean Utility Model Registration No. 276236 is described in detail below with reference to FIG. 1 illustrating configuration of the automatic tablet packaging machine. First of all, a memory 101, in which information about tablets accommodated in respective tablet cassettes 100 is recorded, is mounted in an adaptor 102 installed in the lower side of the tablet cassettes 100, and terminals 103 protruded downwardly to the lower side of the adaptor 102 are connected to a socket 201 installed on the upper side of the cassette support 200. A microcomputer 300 connected to the socket 201 reads tablet information recorded in the memory 101 to recognize information of tablets accommodated in the tablet cassettes.

In the above-mentioned automatic tablet packaging machine, the tablets are discharged by a rotation member in the tablet cassettes 100 rotated by a motor disposed in the cassette support 200. In this case, the terminals inserted into the socket 201 vibrate due to vibration of the tablet cassettes 100 so that contact failure is generated and the tablet information cannot be normally read due to contact failure.

Moreover, in the above-mentioned automatic tablet packaging machine, the tablet information is recorded in the memory 101. The tablet information can be replaced with new tablet information by a writer. In other words, since, in a conventional automatic tablet packaging machine, the tablet information must be replaced by the writer, it is inconvenient to use and manage the writer.

Furthermore, since, in the above-mentioned automatic tablet packaging machine, a tablet cassette with a same identification cannot be mounted, position tracking of a tablet cassette without response is unable, and there is a limit for the number of the tablet cassettes to be used. In other words, if tablet cassettes provided by the same identification are mounted in different tablet cassettes, it is difficult to select the tablet cassette to be used for the prescription and thus the prescription becomes impossible.

Moreover, according to the conventional automatic tablet packaging machine, it is impossible to analyze a current status of a quantity of remaining tablets in the respective tablet cassettes, and there is no function of notifying lack of the tablets required to prescribe medicine by comparing the remaining quantity of the tablets with a quantity of the tablets to be prescribed.

Furthermore, since an automatic tablet packaging operation of the conventional automatic tablet packaging machine is unconditionally stopped when there is an insufficient quantity of tablets during filling of any prescription, every filling of following prescriptions are stopped.

SUMMARY OF THE INVENTION

Therefore, the present invention has been made in view of the above problems, and it is an aspect of the present invention to provide a tablet packaging controlling apparatus of an automatic tablet packaging machine to precisely recognize information about tablets accommodated in tablet cassettes in a non-contact fashion, in order to remove errors generated by physical contacts between a memory device to store tablet information and a device to access the memory device.

It is another aspect of the present invention to provide a tablet packaging controlling apparatus of an automatic tablet packaging machine to precisely recognize information about tablets accommodated in tablet cassettes in a non-contact fashion, and to update the tablet information with new tablet information.

It is still another aspect of the present invention to provide a tablet packaging controlling apparatus of an automatic tablet packaging machine to automatically track positions of tablet cassettes mounted in a specific cartridge and to display information of positional arrangement for the tracking.

It is still another aspect of the present invention to provide a tablet packaging controlling apparatus of an automatic tablet packaging machine to analyze status of tablets accommodated in respective tablet cassettes and to notify the lack of tablets by comparing a quantity of remaining tablets with a quantity of tablets to be prescribed.

It is still another aspect of the present invention to provide a tablet packaging controlling apparatus of an automatic tablet packaging machine to compare a quantity of tablets to be prescribed with a quantity of remaining tablets such that a packaging operation for a current prescription is in standby when the remaining tablets are short and a following prescription and packaging of tablets are performed.

In accordance with an aspect of the present invention, the above and other aspects can be accomplished by the provision of a tablet packaging controlling apparatus of an automatic tablet packaging machine comprising: a plurality of radio frequency (RF) tags attached to sides of respective tablet cassettes to record information of tablets accommodated in a corresponding tablet cassette; and a plurality of tablet information access units to receive the tablet information recorded in the RF tags via a wireless line, to transmit the tablet information and identification information of cartridges to which the tablet cassettes are mounted to a host terminal, or to record new tablet information transmitted from the host terminal in the RF tags; wherein the host terminal a) creates position arrangement information of the tablet cassettes, i.e., tracking which tablet cassettes are mounted in specific cartridges, using the identification information of the respective cartridges and the tablet information, which are transmitted from the table information access units and stores the generated position arrangement information in a memory, b) estimates a quantity of remaining tablets by subtracting a quantity of tablets discharged according to the prescription from a quantity of the tablets accommodated in the respective tablet cassettes to store the estimate quantity of the remaining tablets in the memory, c) controls the discharge of the tablets according to the prescription such that the tablets are discharged in the order of tablet cassettes accommodating a large quantity of the tablets when prescribed tablets are accommodated in the plurality of tablet cassettes, and d) controls operations of the tablet information access units to package only the accommodated tablets when the prescription is compared with the quantity of the remaining tablets and a result of the comparison to the remaining tablets are short, and displays the quantity of the short tablets on a liquid crystal display while alarming a prescription inability, and e) controls operations of the tablet information access units to package the remaining tablets whose prescription stops when the short tablets are supplemented.

Each of the tablet information access units comprises: an antenna installed at a position facing the RF tags to transmit and receive radio frequency (RF) signals to/from the RF tags; an RF module to demodulate and output the RF signals received through the antenna into tablet information and to modulate tablet information, which is required to be updated, into RF signals to be outputted; a main control unit to transmit the tablet information demodulated by the RF module and cartridge information stored in the memory to the host terminal, to transmit the tablet information required to be updated by the host terminal to the RF module, and to control prescribing operation under the control of the host terminal; an interface unit to interface information transmitted and received between the main control unit and the host terminal to and from each other; a tablet discharge detecting unit to detect whether tablets accommodated in the tablet cassette are discharged or not and to output a detecting signal to the main control unit; and a motor driving unit to drive a motor to rotate a rotation member which is accommodated in the tablet cassette.

The tablet information access units are accommodated in respective tablet cassette supports.

The host terminal comprises: an interface unit to interface transmission and reception of data to and from the tablet information access units; a position arrangement information generator to generate position arrangement information of a tablet cassette for determining a cartridge to be driven for the prescription using the cartridge information and the tablet information, which are transmitted from the tablet information access unit; a central processing unit to store the generated position arrangement information in the memory, to estimate a quantity of remaining tablets by subtracting a quantity of tablets discharged according to the prescription from a quantity of the tablets accommodated in the respective tablet cassettes to store the estimated quantity of the remaining tablets in the memory, to control the discharge of the tablets according to the prescription such that the tablets are discharged in the order of tablet cassettes accommodating a large quantity of the tablets when prescribed tablets are accommodated in the plurality of tablet cassettes, to control operations of the tablet information access unit to package only the accommodated tablets when the prescription is compared with the quantity of the remaining tablets and a result of the comparison to the remaining tablets are short, to display the quantity of the short tablet on a liquid crystal display while alarming of a prescription inability, and to control operations of the tablet information access unit to package the remaining tablets whose prescription stops when the short tablet is supplemented; a liquid crystal display to display the position arrangement information of the tablet cassettes on a screen under the control of the central processing unit; and a prescription inability alarming unit to alarm a case when the tablets are short and due to this the prescription cannot be performed to the exterior of the device under the control of the central processing unit.

The position arrangement information of the tablet cassettes comprises: identification information of the cartridges to determine a cartridge to be driven; tablet information of the tablet cassettes mounted in corresponding cartridges; tablet information of the previously mounted tablet cassettes; status information of the tablet cartridges; information whether there is tablet cassettes with the same number; and link information of the same tablet cassettes.

The position arrangement information generator updates the position arrangement information whenever an event is generated and provides the updated position arrangement information to the central processing unit.

The tablet packaging controlling apparatus of an automatic tablet packaging machine according to the present invention utilizes an RF tag and a tablet information access unit for transmitting/receiving tablet information to/from the RF tag in a wireless line, and thus is free from errors generated by physical contact between a memory device for storing tablet information and a device for accessing the memory device.

Moreover, when a tablet cassette is mounted or detached to or from the cartridge, a status change can be tracked and made into database in real time so that, the position information of the tablet cassettes, whether a certain tablet cassette is in which cartridge or which cartridge is driven for the prescription of tablets accommodated in a specific tablet cassette, can be automatically tracked.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

The above and other objects, features and other advantages of the present invention will be more clearly understood from the following detailed description taken in conjunction with the accompanying drawings. Hereinafter, the present invention will be described in detail such that those skilled in the art can easily understand and perform the preferred embodiments.

Figure 2:
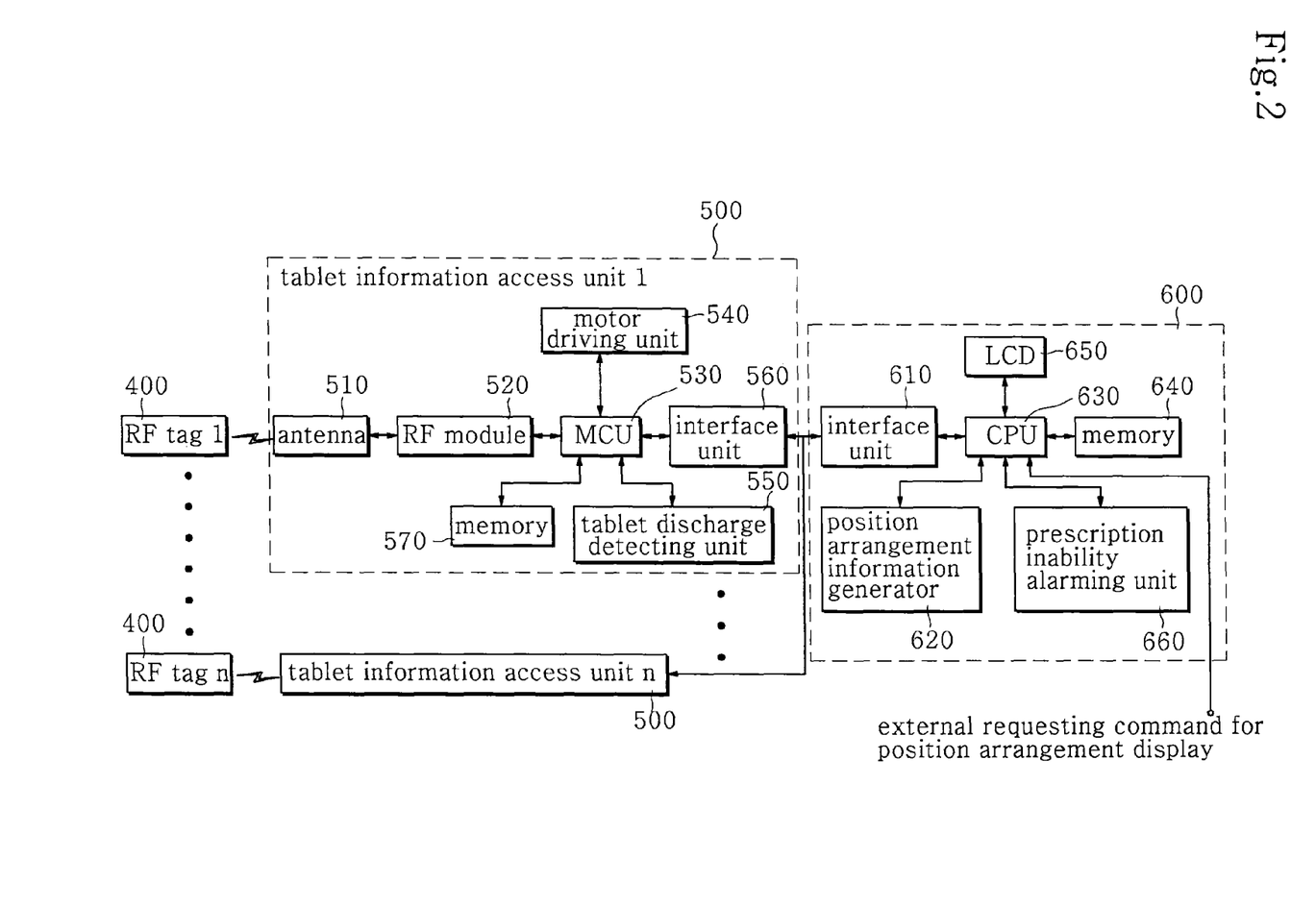
FIG. 2 is a block diagram illustrating a tablet packaging controlling apparatus of an automatic tablet packaging machine according to an embodiment of the present invention.
Figure 3:
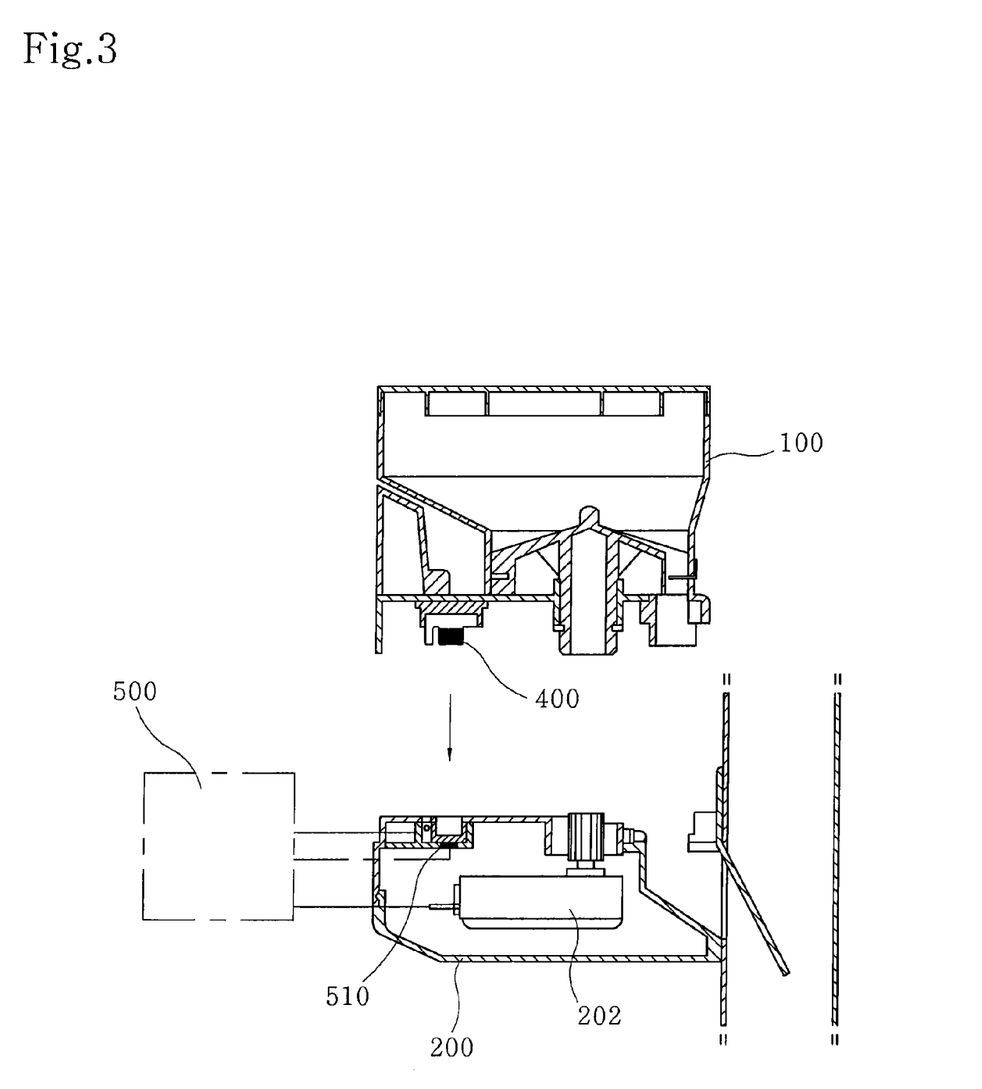
FIG. 3 is a view illustrating positions to which components of the tablet packaging controlling apparatus of the automatic tablet packaging machine according to the embodiment of the present invention are attached.

FIG. 2 is a block diagram illustrating a tablet packaging controlling apparatus of an automatic tablet packaging machine according to an embodiment of the present invention, and FIG. 3 is a view illustrating positions to which components of the tablet packaging controlling apparatus of the automatic tablet packaging machine according to the embodiment of the present invention are attached.

As illustrated in FIG. 2, the tablet packaging controlling apparatus according to the embodiment of the present invention includes a plurality of radio frequency (RF) tags 400, a plurality of tablet information access units 500 respectively corresponding to the RF tags 400, and a host terminal 600 to control a tablet packaging operation of the plurality of tablet information access units 500.

Each of the RF tags 400 is attached to one side of each tablet cassette. More specifically, as shown in FIG. 3, each of the RF tags 400 is attached to the lower end of each tablet cassette 100 placed on each of the tablet cassette supports (i.e., cartridge) 200, and records information of the tablets accommodated in a corresponding tablet cassette 100. Each of the RF tags 400 is a readable and writable RF tag using the same frequency band (13.56 MHz) as that of a smart card and has an internal memory in which tablet information, such as tablet name, tablet weight, cassette identification information, and the like is recorded.

On the other hand, the plurality of tablet information access units 500 receive the tablet information recorded in the RF tags 400 via a wireless line, transmit the tablet information and the cartridge identification information stored in a memory 570 to the host terminal 600, record new tablet information inputted from the host terminal 600 in the RF tags 400, and perform the prescription and packaging of the tablets under the control of the host terminal 600.

Each of the tablet information access units 500, as illustrated in FIG. 3, is an assembly of electronic components electrically connected to each other on printed circuit boards (PCB) accommodated in the respective tablet cassette supports 200. Each of the tablet information access units 500 includes an antenna 510, installed at a position facing the RF tag 400 attached to the tablet cassette 100 to be placed on the tablet cassette supports 200, to transmit and receive RF signals to/from the RF tag 400, an RF module 520 to demodulate and output the RF signals received through the antenna 510 into tablet information and to modulate tablet information, which is required to be updated by the host terminal 600, into RF signals to be outputted, a main control unit (MCU) 530 to transmit the tablet information demodulated by the RF module 520 and cartridge information stored in the memory 570 to the host terminal 600, to transmit the tablet information required to be updated by the host terminal 600 to the RF module 520, and to control filling the overall prescription, and an interface unit 560 to interface information transmitted and received between the MCU 530 and the host terminal 600 to and from each other.

According to another embodiment of the present invention, the tablet information access unit 500 further includes a tablet discharge detecting unit 550 to detect whether tablets accommodated in the tablet cassette 100 are discharged or not and to output a detecting signal to the MCU 530. The tablet discharge detecting unit 550 may be implemented with a sensor including an infrared light emission unit and a photo-transistor.

In addition, the tablet information access unit 500 may further include a motor driving unit 540 to drive a motor 202 to rotate a rotation member which is accommodated in the tablet cassette 100 and discharges the tablets out of the tablet cassette 100 one by one according to the control of the MCU 530.

Moreover, although the host terminal 600 is provided in the tablet packaging controlling apparatus as illustrated in FIG. 2, the host terminal 600 is not installed in the same apparatus as the tablet information access unit 500 to control the cartridge, but is installed in a remote site to transmit and receive data to and from the tablet information access unit 500 through a wire communication device or a wireless communication device.

The host terminal 600 can be implemented by a personal computer (PC) used by an operator or an information terminal capable of performing the same function as the PC.

The host terminal 600 includes an interface unit 610 to interface transmission and reception of data to and from the tablet information access unit 500, a position arrangement information generator 620 to generate position arrangement information of a tablet cassette for determining a cartridge whose motor 202 is to be driven for the prescription using the cartridge information and the tablet information, which are transmitted from the tablet information access unit 500, a central processing unit 630 to store the generated position arrangement information in the memory 640, to estimate a quantity of remaining tablets by subtracting a quantity of tablets discharged according to the prescription from a quantity of the tablets accommodated in the respective tablet cassettes to store the estimated quantity of the remaining tablets in the memory 640, to control the discharge of the tablets according to the prescription such that the tablets are discharged in the order of tablet cassettes accommodating a large quantity of the tablets when prescribed tablets are accommodated in the plurality of tablet cassettes, and to control operations of the tablet information access unit 500 to package only the accommodated tablets when the prescription is compared with the quantity of the remaining tablets and a result of the comparison of the remaining tablets shows they are short, and to control operations of the tablet information access unit 500 to package the remaining tablets whose prescription stops when the short tablets are supplemented, a liquid crystal display (LCD) 650 to display the position arrangement information of the tablet cassettes on a screen under the control of the central processing unit 630, and a prescription inability alarming unit 660 to issue an alarm in a case when the tablets are insufficient in number and, due to this, the prescription cannot be filled under the control of the central processing unit 630.

Here, the position arrangement information of the tablet cassettes includes identification information of the cartridges to determine a cartridge to be driven, the tablet information of the tablet cassettes mounted in corresponding cartridges, tablet information of the previously mounted tablet cassettes, status information of the tablet cartridges, information whether there are tablet cassettes with the same number, and link information of the same tablet cassettes, and the position arrangement information generator 620 updates the position arrangement information whenever an event is generated and provides the updated position arrangement information to the central processing unit 630. In addition, the prescription inability alarming unit 660 alarms a user of a status when the prescription cannot be performed in visual and audible manner.

Operations of the tablet packaging controlling apparatus according to the embodiment of the present invention configured as such are described in detail as follows.

Firstly, as illustrated in FIG. 3, when a tablet cassette 100 is used to accommodate headache tablets, tablet information, such as name of the headache remedies, that is, name of the tablets, quantity of the tablets, the cassette identification information, etc., must be previously registered in the RF tag 400 attached to a corresponding tablet cassette 100.

As such, in order to register tablet information in the RF tag 400, an operator places the tablet cassette 100 on the tablet cassette support 200. After that, identification information of the tablet information access unit 500 and the tablet information are inputted into the tablet information access unit 500 through the host terminal 600.

Here, the identification information of the tablet information access unit 500 is used to assign an address of the tablet information access unit 500, that is, to assign the cartridge identification information to the tablet information access unit 500.

As such, when the operator inputs the identification information of the tablet information access unit 500 and the tablet information thereto, the MCU 530 holding the inputted identification information of the tablet information access unit 500 transmits the tablet information inputted from the host terminal 600 to the RF module 520, so that the corresponding tablet information is modulated into an RF signal and the modulated RF signal is transmitted to the RF tag 400 through the antenna 510.

Accordingly, the memory controller in the RF tag 400 registers the received tablet information in the memory, so that tablet information is recorded in the RF tag 400. Although not illustrated in the drawing, each of the RF tags 400 includes a memory to store data, a controller to transmit information and to record received information, an antenna and a signal processor to transmit and receive the RF signal. Since the internal configuration of the RF tag is already known, the detailed description will be omitted.

On the other hand, when the tablet cassette 100 to which the RF tag 400, in which the tablet information is recorded, is attached is placed on the tablet cassette supports 200, as illustrated in FIG. 3, the RF tag 400 responds to RF signals transmitted from an antenna 510 located at the tablet cassette supports 200, and modulates the tablet information recorded in the internal memory to an RF signal to be transmitted.

The tablet information in the form of RF signals transmitted from the RF tag 400 are received by the antenna 510 located at a position facing thereto and are supplied to the RF module 520. The RF module 520 demodulates the tablet information into the original tablet information before the modulation and then transmits the demodulated tablet information to the MCU 530.

Accordingly, the MCU 530 recognizes the tablet information of tablets accommodated in the tablet cassette 100 placed on the tablet cassette support 200 and stores the recognized tablet information in the internal memory.

If the host terminal 600 requests a transmission of the stored tablet information in a case when the tablet information of tablets accommodated in the tablet cassette 100 is stored, the MCU 530 transmits its own address information, in other words, the cartridge identification information as the identification information of the tablet information access unit 500 and tablet information stored in the MCU 530, to the host terminal 600. In this case, the transmission of the tablet information is carried out such that all information is transmitted in the early stage. However, if the host terminal 600 requests the transmission of information after the transmission of all information, the information is not unconditionally transmitted, but is transmitted only when new information (an event) is generated. For example, changed information is transmitted to the host terminal 600 only when the tablet information of tablets accommodated in the tablet cassette or the cassette information is changed.

The above-mentioned operation is to prevent a load from increasing due to data transmission and time and economical losses in data processing generated by transmitting previous data when the tablet information is not changed. It is preferable that a message indicating no change of data is generated when data is not changed and the message is transmitted to the host terminal 600.

The interface unit 610 of the host terminal 600 receives the tablet information and the cartridge identification information, transmitted from the tablet information access unit 500, and provides the same to the central processing unit 630. The central processing unit 630 analyzes the received information. In a case when new information is transmitted due to event generation, the central processing unit 630 stores the new information in the memory 640 and transmits corresponding data to the position arrangement information generator 620.

The position arrangement information generator 620 creates the position arrangement information of a tablet cassette to determine a cartridge to be driven for the prescription based on the transmitted cartridge identification information and the transmitted tablet information and transmits the same to the central processing unit 630. Here, the position arrangement information of tablet cassettes means information used to determine whether which tablet cassette is in which cartridge or which tablet cassette is driven to prescribe tablets accommodated in a specific tablet cassette. The position arrangement information of cassettes may be used to automatically track a position of a tablet cassette mounted in a specific cartridge.

The position arrangement information of cassettes contains the identification information of cartridges to determine a cartridge to be driven, the tablet information of the tablet cassettes mounted in corresponding cartridges, the tablet information of the previously mounted tablet cassettes, the status information of the tablet cartridges, the information whether there are tablet cassettes with the same number, and the link information of the same tablet cassettes.

The central processing unit 630 stores the position arrangement information of cassettes provided from the position arrangement information generator 620 in the memory 640, and analyzes quantities of tablets respectively accommodated in the tablet cassettes to store the quantities in the memory 640. For example, the central processing unit 630 analyzes tablets A accommodated in which tablet cassette and how much the quantity of the tablets A is and stores the analyzed information in the memory 640.

To check whether there is a cassette to accommodate specific tablets in a specific cartridge or the table cassette to accommodate the specific tablets is in which cartridge, a user requests to display the position arrangement information of cassettes using a data input unit.

In other words, when there is an external requesting command for the displaying of the position arrangement information of the cassettes, the central processing unit 630 extracts the position arrangement information of cassettes stored in the memory 640 to display the same on a screen through the LCD 650. Thus, the user can easily check whether tablets to be found by the user are in which cartridge, in other words, whether a desired tablet cassette is in which cartridge.

On the other hand, if the prescription information is inputted, the host terminal 600 compares the quantities of respective remaining tablets stored in the memory 640 with the quantity of tablets to be prescribed, which recorded in the prescription, and checks a quantity of short tablets. As a result of the checking, there is no shortage of tablets, the tablet information access unit 500 is normally controlled to request the discharge of tablets to be packaged, and the MCU 530 of the tablet information access unit 500 requested to discharge the tablets controls the motor driving unit 540 to drive the motor 202 such that one tablet or two tablets are discharged out of the tablet cassette 100 (the tablet discharge detecting unit 550 detects whether the tablets are discharged or not) to be fed to a tablet packaging place and then the packaging of the tablets are automatically performed according to the prescription. Here, the central processing unit 630 of the host terminal 600 determines the order of discharging tablets to be packaged and provided in the determined order to the tablet information access unit 500. For example, when the tablets recorded in the prescription are accommodated in several tablet cassettes, tablets accommodated in a tablet cassette to accommodate the greatest quantity of tablets are firstly discharged, and tablets accommodated in a tablet cassette to accommodate the next quantity of tablets are discharged when tablets to be prescribed remain after discharging the tablets accommodated in the corresponding tablet cassette.

In addition, when there is a shortage of tablets as a result of comparing the quantities of respective remaining tablets with the quantity of tablets to be prescribed, the prescription information is transmitted to the tablet information access unit 500 as it is so that the prescription is stopped due to the shortage of tablets and an error is generated.

Thus, in order to solve the error, the central processing unit 630 employed in the present invention changes the prescription information such that the prescription is filled according to a quantity to be prescribed and transmits the changed prescription information to the tablet information access unit 500. The central processing unit 630 displays the shortage of tablets on the LCD 650, and drives the prescription inability alarming unit 660 such that the prescription inability status can be recognized from the exterior of the device. Moreover, the central processing unit 630 creates standby information indicating that the prescription is not completed due to the shortage of tablets and stores the created information in the memory 640.

In the above description, the prescription inability alarming unit 660 may alarm the prescription inability status in visual manner using an alarming lamp, in audible manner using an alarming sound, or in a visual and audible manner using the combination thereof.

Here, if current quantities of tablets respectively indicate ten tablets A, 25 tablets B, 17 tablets C, and thirty tablets D and quantities of prescribed tablets respectively indicate fifteen tablets A, fifteen tablets B, fifteen tablets C, and fifteen tablets D, the tablets A are substantially short by as many as five. In this case, if the prescription information is transmitted to the tablet information access unit 500 as it is, the table information access unit 500 cannot perform the prescription and generates an error. In this case, the conventional automatic tablet packaging machine unconditionally stops the prescription.

However, in the present invention, the central processing unit 630 changes the prescription information into prescription information indicating ten tablets A, ten tablets B, ten tablets C, and ten tablets D to be transmitted to the table information access unit 500, drives the prescription inability alarming unit 660 to alarm the prescription inability status in a visual and/or audible manner, and simultaneously displays the status where the number of tablets A are short by as many as five and the prescription information is changed on the LCD 650. Then, the user checking the status can precisely recognize current prescribing status and can promptly supplement the shortage of tablets. The tablet information access unit 500 can normally perform the prescription of currently holding remaining tablets.

Moreover, when the standby information about the shortage of tablets is created, as described above, the central processing unit 630 does not stop the prescription but controls the next prescription in the same operation control as that of the initial prescription. When there is a shortage of tablets for the initial prescription, the next prescription cannot be performed until the corresponding tablets are resupplied in the conventional art. However, according to the present invention, in order to solve the problem, the standby information is created for the shortage of tablets to be stored in the memory 640 and the next prescription is performed so that the prescription and the packaging of the tablets are effectively performed.

If the user supplements corresponding tablets to be short, tablet supplement information is provided to the central processing unit 630 via the RF tag 400 and the tablet information access unit 500 and the position arrangement information generator 620 associated with the central processing unit 630 generates information about a tablet cassette where an event occurs and new position arrangement information about the tablet cassette to be stored in the memory 640 so that the cassette information and the cartridge information are updated in real time whenever the event occurs.

When the position arrangement information is updated, the central processing unit 630 extracts the standby information previously stored in the memory 640 to check whether the corresponding tablets are supplemented. When it is determined that the short tablets are supplemented as a result of the checking, the central processing unit 630 controls the tablet information access unit 500 to firstly perform the prescription and the packaging which were not completed due to the standby information, prior to the performance of the next prescription and packaging after currently performing prescription and packaging are completed.

Finally, when the prescription and packaging are performed based on the written prescription such that tablets accommodated in specific tablet cassettes are discharged, it is preferred that the position arrangement information is updated in proper time. In other words, since the quantities of tablets accommodated in the respective tablet cassettes can be confirmed based on the previously stored position arrangement information, the number of discharged tablets is checked when the tablets accommodated in the tablet cassettes are discharged and the quantity of tablets remaining in a corresponding tablet cassette by subtracting the quantity of discharged tablets from the previously stored quantity of tablets in the corresponding tablet cassettes, and the estimated quantity is stored in the memory 640.

According to the present invention, the position arrangement information of cassettes is updated and displayed on a screen, so that the user can easily track a tablet cassette accommodating specific tablets and a plurality of tablet cassettes having same information can be utilized. Thus, the utility of the tablet cassettes can be enhanced and operational confusion can be also solved.

Moreover, when the prescription and packaging for a written prescription is impossible due to the shortage of remaining tablets, the next prescription and packaging for a next written prescription can be performed so that operational efficiency of the automatic tablet packaging machine can be improved.

Accordingly, since the tablet information is provided as RF signals from a device in which the tablet information is stored, precise tablet information can be provided without error in comparison to the conventional tablet identification device to receive the table information by physical contact, and the previously stored tablet information can be easily updated into new tablet information without an additional device such as an information writer.

In addition, since a status change can be tracked in real time when a tablet cassette is mounted or detached to or from the cartridge, the position information of the tablet cassettes, whether a certain tablet cassette is in which cartridge or which cartridge is driven for the prescription of tablets accommodated in a specific tablet cassette, can be automatically tracked.

Due to the above-mentioned advantages, tablet cassettes having a same identification (means that identification information of the tablet cassettes is same) can be mounted to different cartridges. Since a position tracking of a tablet cassette without response is enabled, operational range of the automatic tablet packaging machine can be widened.

Furthermore, since the same number tablet cassettes can be used, restriction of using the tablet cassettes can be removed. Identification information of the tablet cassettes and identification information of the cartridge are separately provided to use so that operational confusion can be also avoided.

In addition, status of tablets accommodated in respective tablet cassettes is analyzed and a quantity of remaining tablets is compared with a quantity of prescribed tablets when the prescription is performed such that a shortage of tablets is notified when the quantity of the tablets to be prescribed is short.

Moreover, when the quantity of remaining tablets is short by comparing the quantity of prescribed tablets with the quantity of remaining tablets, the packaging for a current prescription is in a standby mode and next prescription and packaging for a next written prescription can be performed without stopping.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tablet packaging controlling apparatus of an automatic tablet packaging machine comprising:
    a plurality of radio frequency (RF) tags attached to sides of respective tablet cassettes to record information of tablets accommodated in a corresponding tablet cassette; and
    a plurality of tablet information access units to receive the tablet information recorded in the RF tags via a wireless link, to transmit the tablet information and identification information of cartridges to which the tablet cassettes are mounted to a host terminal, or to record new tablet information transmitted from the host terminal in the RF tags;
    wherein the host terminal:
    a) creates position arrangement information of the tablet cassettes using the identification information of the respective cartridges and the tablet information, which are transmitted from the tablet information access units and stores the generated position arrangement information in a memory,
    b) estimates a quantity of remaining tablets by subtracting a quantity of tablets discharged according to a prescription from a quantity of the tablets accommodated in the respective tablet cassettes to store the estimated quantity of the remaining tablets in the memory,
    c) controls the discharge of the tablets according to the prescription such that the tablets are discharged in an order beginning with the tablet cassettes accommodating the largest quantity of the tablets when prescribed tablets are accommodated in the plurality of tablet cassettes,
    d) controls operations of the tablet information access units to package only the accommodated tablets when the prescription is compared with the quantity of the remaining tablets and a result of the comparison indicates the number of remaining tablets is short, and displays the quantity of the shortage of tablets on a liquid crystal display while issuing an alarm indicating a prescription filling inability, and
    e) controls operations of the tablet information access units to package the remaining tablets when the shortage of tablets is supplemented.

2. The tablet packaging controlling apparatus according to claim 1, wherein each of the tablet information access units comprises:
    an antenna installed at a position facing the RF tags to transmit and receive radio frequency (RF) signals to/from the RF tags;
    an RF module to demodulate and output the RF signals received through the antenna into tablet information and to modulate tablet information, which is required to be updated, into RF signals to be outputted;
    a main control unit to transmit the tablet information demodulated by the RF module and cartridge information stored in a memory to the host terminal, to transmit the tablet information required to be updated by the host terminal to the RF module, and to control the prescription filling operation under the control of the host terminal; and
    an interface unit to interface information transmitted and received between the main control unit and the host terminal to and from each other.

3. The tablet packaging controlling apparatus according to claim 2, wherein the tablet information access units are accommodated in respective tablet cassette supports.

4. The tablet packaging controlling apparatus according to claim 1, wherein each of the tablet information access units comprises:
    a tablet discharge detecting unit to detect whether tablets accommodated in the tablet cassette are discharged or not and to output a detecting signal to the main control unit; and
    a motor driving unit to drive a motor to rotate a rotation member which is accommodated in the tablet cassette.

5. The tablet packaging controlling apparatus according to claim 1, wherein the tablet information comprises cassette identification information to identify the tablet cassettes.

6. The tablet packaging controlling apparatus according to claim 1, wherein the host terminal comprises:
    an interface unit to interface transmission and reception of data to and from the tablet information access units;
    a position arrangement information generator to generate position arrangement information of a tablet cassette for determining a cartridge whose motor is to be driven for the prescription using the cartridge information and the tablet information, which are transmitted from the tablet information access unit;
    a central processing unit to store the generated position arrangement information in the memory, to estimate a quantity of remaining tablets by subtracting a quantity of tablets discharged according to the prescription from a quantity of the tablets accommodated in the respective tablet cassettes to store the estimated quantity of the remaining tablets in the memory, to control the discharge of the tablets according to the prescription such that the tablets are discharged in the order of tablet cassettes accommodating a large quantity of the tablets when prescribed tablets are accommodated in the plurality of tablet cassettes, to control operations of the tablet information access unit to package only the accommodated tablets when the prescription is compared with the quantity of the remaining tablets and a result of the comparison indicates the number of remaining tablets is short, to display the shortage quantity of the tablets on a liquid crystal display while issuing an alarm indicating a prescription filling inability, and to control operations of the tablet information access unit to package the remaining tablets when the shortage of tablets is supplemented;

a liquid crystal display to display the position arrangement information of the tablet cassettes on a screen under the control of the central processing unit; and a prescription filling inability alarming unit to issue an alarm in a case when the number of tablets is short and due to this the prescription cannot be filled under the control of the central processing unit.

7. The tablet packaging controlling apparatus according to claim 6, wherein the position arrangement information of the tablet cassettes comprises:

identification information of the cartridges to determine a cartridge whose motor is to be driven;

tablet information of the tablet cassettes mounted in corresponding cartridges;

tablet information of the previously mounted tablet cassettes;

status information of the tablet cartridges;

information as to whether there are tablet cassettes with the same identification information; and information linking a tablet cassette to other cassettes having the same tablets.

8. The tablet packaging controlling apparatus according to claim 6, wherein the position arrangement information generator updates the position arrangement information whenever an event that changes the position arrangement information occurs and provides the updated position arrangement information to the central processing unit.

9. The tablet packaging controlling apparatus according to claim 6, wherein the alarm of the prescription filling inability alarming unit is visual and audible.

10. The tablet packaging controlling apparatus according to claim 6, wherein the central processing unit controls the tablet information access unit to perform the packaging of only the number of tablets capable of being packaged when the number of tablets is short for a certain prescription, and to perform the packaging of the remaining tablets for the certain prescription right after the shortage of tablets is supplemented.

* * * * *